(12) United States Patent
van der Meer et al.

(10) Patent No.: US 6,337,707 B1
(45) Date of Patent: Jan. 8, 2002

(54) IMAGE FORMING DEVICE WITH SEPARATELY ENERGIZABLE FORMING ELEMENTS

(75) Inventors: René J. van der Meer, CS Venlo; Eric H. J. M. Stulemeijer, BH Velden, both of (NL)

(73) Assignee: Oce Technologies, B.V., Venlo (NL)

( * ) Notice: Subject to any disclaimer, the term of this patent is extended or adjusted under 35 U.S.C. 154(b) by 0 days.

(21) Appl. No.: 09/410,754

(22) Filed: Oct. 1, 1999

(30) Foreign Application Priority Data

Oct. 2, 1998 (NL) .............................. 1010238

(51) Int. Cl.⁷ ........................... B41J 2/435; B41J 29/36
(52) U.S. Cl. ........................................ 347/237; 347/9
(58) Field of Search ............................... 347/9, 22, 43, 347/117, 116, 199, 209, 237, 238, 5, 240, 247; 382/162, 165

(56) References Cited

U.S. PATENT DOCUMENTS

| | | | |
|---|---|---|---|
| 4,157,553 A | | 6/1979 | Diddens ................... 347/145 |
| 4,860,035 A | * | 8/1989 | Meuleman et al. ......... 347/116 |
| 5,239,318 A | | 8/1993 | Vannerson ................. 347/128 |
| 5,389,953 A | * | 2/1995 | Agar et al. ................... 347/5 |
| 5,587,730 A | * | 12/1996 | Karz .......................... 347/43 |
| 5,818,499 A | * | 10/1998 | Orlicki et al. ............. 347/237 |
| 5,892,532 A | * | 4/1999 | Katakura et al. ........... 347/240 |
| 5,974,171 A | * | 10/1999 | Hayashi et al. ............. 382/162 |

FOREIGN PATENT DOCUMENTS

| | | | | |
|---|---|---|---|---|
| EP | 0191521 | | 8/1986 | |
| EP | 568283 A1 | | 4/1993 | |
| EP | 0595388 | | 5/1994 | |
| JP | 62-161576 | * | 7/1987 | |
| JP | 63-69667 | * | 3/1988 | .............. B41J/3/20 |
| JP | 2-39562 | * | 2/1990 | |
| JP | 2-265765 | * | 2/1990 | |

* cited by examiner

Primary Examiner—Hai C. Pham
(74) Attorney, Agent, or Firm—Birch, Stewart, Kolasch & Birch, LLP

(57) ABSTRACT

An image forming device for registration of images built up of pixels (pixel patterns), provided with: one or more image registration units each including a number of image forming elements and electronic drivers in order to energize each image forming element separately to form the pixels, a control unit for controlling the various image forming functions of the image forming device, wherein the electronic drivers are provided with a circuit for measuring the output characteristic of each driver and in that the control unit determines, by reference to the measured output characteristic, any malfunctioning of the image forming element driven by the associated driver and correction means for eliminating the malfunction or eliminating the visible effect thereof on the prints produced by the image forming device.

8 Claims, 2 Drawing Sheets

IMAGE FORMING DEVICE WITH SEPARATELY ENERGIZABLE FORMING ELEMENTS

BACKGROUND OF THE INVENTION

1. Technical Field of the Invention

The invention relates to an image forming device for registration of images built up from pixels (pixel patterns), which image forming device is provided with one or more image registration units each including a number of image forming elements and electronic drivers for separately energizing each image forming element to form the pixels. The invention also relates to an improved image registration unit for use in such an image forming device.

2. Description of Related Art

Image forming devices as described above are known in various technologically different embodiments. There are electrostatic or electrophotographic image forming devices wherein an electrostatic charge image is formed on a dielectric or photoconductive medium by means of one or more image registration units consisting of an array of separately energizable electrodes or an array of LEDs. The charge image is then developed with toner powder, and the powder image is transferred to a receiving support and fixed thereon.

Magnetographic image forming devices are comparable to the above electrostatic or electrophotographic image forming devices and by means of an array consisting of minuscule magnetic heads write a latent magnetic image on a magnetizable medium, this image is developed with magnetically attractive toner powder, and the toner powder image is finally in turn transferred and fixed on an image receiving material.

Another known image forming technology, in which images built up from pixels are recorded, is the ink jet technology. In this technology, image registration units are used which contain fine ink ducts or ink tubes, which again can each be driven separately to eject fine ink droplets on to an image registration medium. The inkjet technology is known in many embodiments which will not be discussed in greater detail here, except to say that in all these embodiments image registration units are used which, just like the image forming units used in the above image forming technologies, are equipped with electronic drivers by means of which each ink-ejecting ink tube (image forming element) can be energized separately to eject one or more ink droplets.

A typical example of an image forming unit including a number of image forming elements, in this case each consisting of an endless circular electrode, and electronic drivers for separately energizing each image forming element (circular electrode) is described in European Patent Application No. 0 595 388. The production of the image forming unit, and the device in which it is used, are described in detail in the above patent application, so that reference should be made to this publication for further information.

The invention will hereinafter be described primarily with reference to an image forming device and image forming unit of the type known from EP 0 595 388, but can also be used in other image forming units and devices, for example of the type as indicated hereinabove in the introduction. The image forming unit as described in EP 0 595 388 contains a large number of circular image forming elements which are substantially parallel to one another and which are electrically connected to electronic drivers disposed on a control element. The production of the image forming unit includes a number of steps of varying criticality, which are intended finally to result in an image forming unit of long life, i.e. the separate image forming elements must be permanently connected to their separate driver and no short-circuits are permissible between two or more adjacent image forming elements nor may they form quickly after the image forming unit has been put into use. Despite the great care devoted to the production process, it does happen that the image forming unit produced does have one or more weak spots not observed in the production process, for example one or a few small air bubbles enclosed in the insulating resin layers applied, and after a relatively small number of image loads these air bubbles can result in short-circuits between two image forming electrodes or a break in the electrical contact between the image forming element and the electronic driver.

The results of these faults are directly visible on the prints produced, so that the expensive image forming unit has to be replaced. There is a constant attempt to improve the production process further for the image forming unit, but in practice this will never give an ideal situation in which only permanent image forming units are obtained. There is accordingly a need for an image forming device in which quality faults in the image registration due to the breakdown or malfunctioning of one or more image forming elements can be dispensed with or can be made practically invisible on the print without directly replacing the image forming unit.

SUMMARY OF THE INVENTION

According to the invention, an image forming device has electronic drivers that are provided with a check circuit by means of which the output characteristic of the electronic driver can be measured and a control device which by reference to the measured output characteristic can determine proper operation or malfunctioning of the image forming element controlled by the driver. If the image forming element is found to operate incorrectly, the control device takes corrective action to eliminate the malfunction or so influence the image forming process that the visual effect of the inadequate operation of the image forming element on the resulting print is reduced.

By providing the drivers according to the invention with a check circuit by means of which the output circuit of the driver can be measured, the control device of the printing apparatus can monitor the operation of each image forming element. By comparing the measured value of the output voltage and/or shape of the output voltage pulse with a reference, it is possible for the control device to determine which image forming element or elements do not operate properly and what the nature of the malfunction is, and then on the basis thereof control a correction step so that the result of the fault on the finally obtained print is invisible or is barely perceptible. As a result, the consistently expensive image forming element does not have to be replaced directly in the event of breakdown of just one image forming element or even of a number of image forming elements distributed over the total width of the image forming unit.

The correction step which can be carried out in order to remedy the defects occurring and for rendering the same invisible or less visible on the print, will often depend on the type of image forming element. One step which is possible for all types of image forming elements (electrostatic, magnetic, LED, ink jet) is to provide the image forming device with one or more smaller auxiliary image forming units, which each comprise only a small number of separately energizable image forming elements and which are displaceable in the image forming plane so that when permanent breakdown of one or more image forming elements is found, e.g. due to a break in the electrical connection, they can be brought into operation instead of the faulty image forming element and take over the function there of the image forming element which is no longer operative.

In the case of a magnetic printing apparatus, an ink jet device or an electrostatic printing apparatus equipped with pin electrodes, it may occur that an image forming element will not operate properly or will operate poorly as a result of soiling or, in the case of an ink jet device, due to clogging or the presence of an air bubble in an ink jet tube. If the control device by measuring the output characteristic of the drivers detects a malfunction of this kind, a cleaning device provided or an air bubble eliminating process can be activated to eliminate the malfunction. The control unit can then again check whether the problem really has been solved, by re-measuring the output characteristic of the driver or drivers concerned and if necessary repeat the cleaning and measuring steps.

Apart from cleaning image forming elements or replacing them by bringing an auxiliary element into position, the result of a fault on an image forming element can also frequently be made practically invisible by appropriate image processing. This is the case for example in image forming units of the type described in European Patent Application 0 595 388. A malfunction occurring with these image forming elements is short-circuiting between two adjacent image forming elements. The results of the short-circuit can be solved via the image processing by the image forming unit regarding the short-circuited image by forming elements as a single image forming element and, at each image line for writing, determining, on the basis of details concerning adjacent image pixels, whether the "image forming element" should or should not be energized. The short-circuited image forming elements are then either energized or not energized simultaneously in each image line for registration. The result of this is a local resolution reduction, but since this resolution reduction is restricted to just a few pixels, it is only very rarely disturbingly perceptible on the prints.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
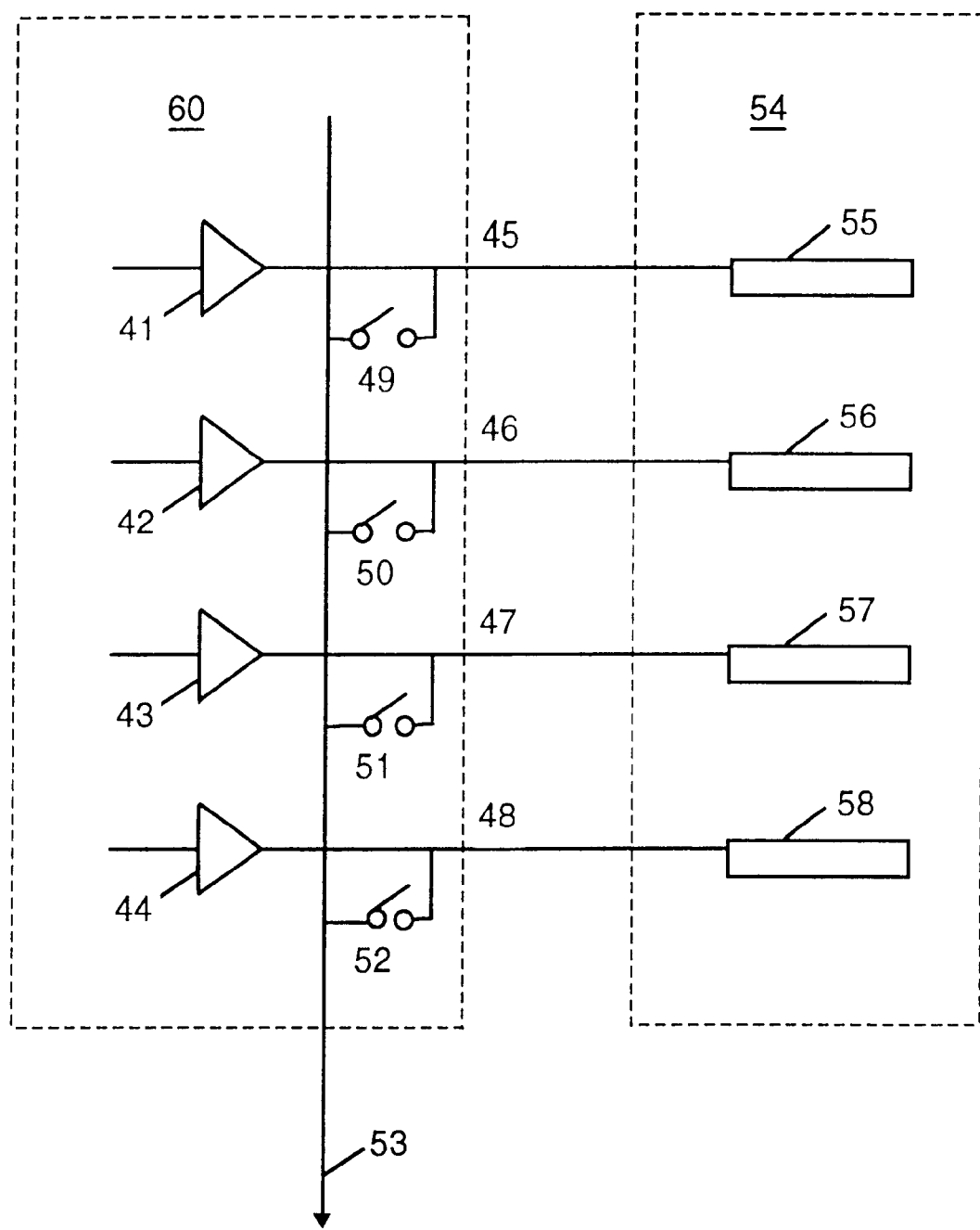
FIG. 1 shows one embodiment of a driver with a check circuit for measuring the output characteristic.

The driver 60 shown in FIG. 1 includes a large number of drivers 41–44 each connected to an image forming element 55–58 which is to be driven and which forms part of a printing apparatus 54, the connection being via output lines 45–48 for measuring an output characteristic of the drivers 41–44. For this purpose, each output 45–48 is provided with a switch 49–52 so that each output can be connected to a common measuring line 53. The drivers 41–44 can be constructed in all kinds of forms but on energization all deliver an analog signal to an image forming electrode 55–58. The form of this analog signal is highly dependent on the load connected to the outputs 45–48. By connecting the outputs sequentially to measuring line 53 via switches 49–52, the condition of the image forming electrode 55–58 can be determined with a simple voltage measurement. It is also possible to determine the form of the analog measuring signal and from this draw conclusions as to the condition of the driver and/or image forming electrode.

The measuring signal can also be used as feed-back for adjustable drivers 41–44, for example to establish an output current or output voltage at a predetermined value.

Figure 2:
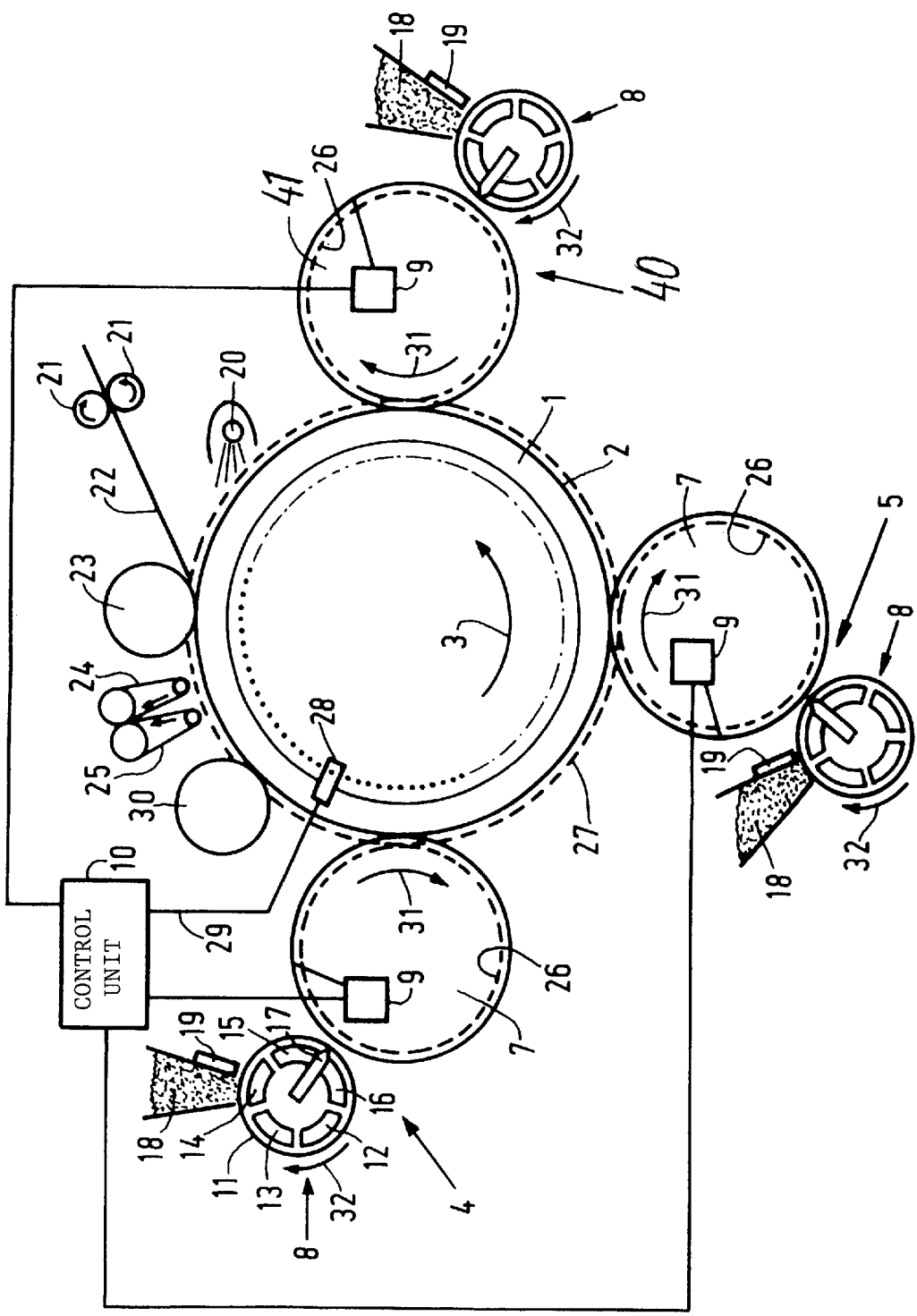
FIG. 2 shows a printing apparatus according to the invention.

The printing apparatus shown in FIG. 2 includes a cylindrical image receiving support 1, the metal shell of which is covered with a layer of silicone rubber 2. The image receiving support 1 can be driven in the direction of the arrow 3 by a suitable driver (not shown). Image forming stations 4 and 5 are disposed along the trajectory of the image receiving support 1. Each of these image forming stations includes a cylindrical image registration unit 7 and an imaging device 8 to form a sub-image on the image registration unit 7. The image registration units 7 are in pressure contact with the image receiving support 1, the pressure in the pressure zones being substantially the same and such that a sub-image formed on the image registration unit is transferred, under the influence of this pressure, to the silicone rubber surface 2 of the image receiving support 1.

Each image registration unit 7 is constructed and made as described in European patent application No. 0 595 388, but including electronic drivers as described with reference to FIG. 1 hereinabove. In FIG. 2, the electronic circuit of which these drivers form part is indicated by reference 9. The electronic circuit 9 in each image registration unit 7 is in turn connected to a central control unit 10, which feeds to each electronic circuit 9 line by line the information concerning the sub-image for printing. The control unit 10 can also check the output characteristic of the drivers in the circuit along this connection.

The imaging devices 8 each include a magnetic roller which is disposed at a short distance (±0.2 mm) from the periphery of the image registration unit 7 and which has a rotatable shell 11 of electrically conductive diamagnetic material (e.g. copper). A stationary magnet system is disposed inside the shell 11 and includes magnets 12, 13, 14, 15, 16 and a soft-iron knife 17 clamped between like poles of the magnets 15 and 16. The tip of the soft-iron knife 17 is located at the place where the distance between the shell 11 and the surface of the image registration unit 7 is formed (imaging devices as described above are illustrated in detail in European patent application No. 0 191 521).

A reservoir 18 filled with electrically conductive magnetically attractive toner powder is disposed at the shell 11 of each magnetic roller. The reservoirs at the image forming stations 4 and 5 each contain a toner powder in a different color, e.g. black in station 4 and red, yellow, green or blue in station 5. At each reservoir 18 there is provided a wiper 19 which ensures that a uniform layer of toner powder is applied to the shell 11 of the magnetic roller. Also disposed along the trajectory of the image receiving support 1 are a heat radiator 20, feeder for a sheet of image receiving material, such feeder including co-operating conveyor rollers 21 and a guide plate 22, a pressure roller 23, a discharger for the sheet of image receiving material, such discharger including co-operating conveyor belts 24 and 25, and a cleaning device 30.

Each image registration unit 7 is driven by a gearwheel 26 mounted on the rotating shaft of the image registration unit 7 and which engages with a gearwheel 27 fixed on the driven shaft of the image receiving support 1 (in the drawing the gearwheels 26 and 27 are shown as broken circles, which circles indicate the pitch circle of each gearwheel).

A pulse generator 28 is connected to the image receiving support 1 and delivers pulses in relation to the angular rotation of the image receiving support 1. The angular rotation between consecutive pulses corresponds to the displacement of the surface of the image receiving support 1 over the width of one image line. The writing of the consecutive image lines on the image registration units 7 by the imaging device 8 can thus be controlled by the control unit 10 by using the pulses delivered by the pulse generator 28 and fed to the control unit 10 via the connection 29.

When the printing apparatus is in operation, the image receiving support 1, the image registration units 7 and the shells 11 of the imaging device 8 are driven in the direction indicated by the arrows 3, 31 and 32. The shells 11 are provided with a thin uniform layer of toner powder. In the zone between the shells 11 and the image registration units 7, at the location of the soft-iron knife 17, the strong magnetic field emerging therefrom results in the formation of a compact toner brush which comes into contact with the image registration unit 7. If no voltage is applied to the image forming elements beneath the surface of the image registration units 7, no developing powder is deposited on the image registration units 7. By selective application of a voltage to the electrodes in accordance with the image pattern, a powder image pattern is formed on the image registration units 7.

The information concerning the image lines to be written for the different sub-images is fed line by line serially by the control unit 10 to a shift register of the electronic circuits 9. On receipt of the next pulse from the pulse generator 28 thereafter, the information stored in the shift register of the first image forming station 4 is transferred to an output register and specific image forming elements, corresponding to the image line to be written, receive voltage via the drivers. In the meantime the shift register is filled with the information of the next image line. On receipt of the next pulse from the pulse generator 28, this image line is written. On receipt of a specific pulse from pulse generator 28, the imaging means of the second image forming station 5 are also activated. The number of pulses after which the imaging device of the second image forming station are activated is predetermined from the distance apart of the image forming stations 4 and 5 as considered along the periphery of the image receiving support 1. The correct number of pulses is established in a control program which is stored in a memory of the control unit 10. The sub-images formed on image registration units 7, for example in black and a supporting color, are transferred in register in the different pressure contact zones to the image receiving support 1. The latter provided with the powder image then passes through a heating zone, where the powder image is softened by the heat radiator 20. The softened powder image is then transferred in the pressure zone between the image receiving support 1 and the pressure roller 23 to an image receiving material (e.g. a sheet of paper) which at the correct time is fed via the feed means 21, 22. The printed image receiving material is discharged by the co-operating conveyor belts 24 and 25.

The image receiving support 1 then moves along the cleaning device 30.

With the inventive control unit 10 it is possible to carry out a test procedure, in which the functioning of the various functions of the printing apparatus is checked and any malfunctioning and causes thereof are traced. Part of this test procedure is determining the mode of operation of the image forming units 7 and image forming unit 41 of the image forming station 40 to be described hereinafter. The output characteristic of each driver in each electronic circuit 9 is measured and from the measured voltage level and/or the shape of the output pulse 10 the control unit determines whether all the image forming elements (electrodes) in each image forming unit 7 operate as required or what image forming elements are not operating and what the nature of the malfunction is. The nature of a malfunction is determined, for example, by comparing the measured output characteristic with a reference. In image forming elements of the type as described hereinbefore with reference to FIG. 2, any malfunction occurring is consistently permanent and consists either of a short-circuit between two adjacent image forming elements (electrodes) or a break in the electrical connection between the driver and the image forming element (electrode). If the control unit 10 detects a short-circuit between two image forming elements, the problem can be solved in the image processing.

The short-circuited image forming elements are defined by the control unit 10 at the image processor, which can also be accommodated in the control unit 10, and on the basis of the available data concerning the surrounding pixels the image processing means determine how the pixel patterns are filled in in the consecutive image lines, while ensuring that the short-circuited electrodes are treated in the same way in each image line; i.e., both are either energized or not energized.

If the control unit 10 finds a break in the connection between a driver and the image forming element, then an auxiliary element is switched in. The printing apparatus of FIG. 2 is for this purpose equipped with an additional image forming station 40.

The image forming station 40 in the embodiment shown in FIG. 2 is identical, at the image forming stations 4 and 5, with an image forming unit 41 and imaging means comprising a magnetic roller and a reservoir 18 with toner powder.

The means (not shown in FIG. 2) for supplying toner powder to the reservoir 18 of image forming station 40 are so constructed in known manner that different toner powders can be supplied corresponding to the toner powder used in the image forming stations 4 and 5.

If the control unit 10 finds one or more faulty image forming units 7 of the image forming stations 4 and 5, one or more corresponding image forming elements of image forming unit 41 are driven in order to take over the function of the defective image forming element or elements. These image forming elements are again driven on the basis of the pulses delivered by the pulse generator 28.

If the image forming station 40 contains only one image forming unit 41, as described above, it is possible in principle to replace just faulty image forming elements of just one of the two image forming stations 4 and 5. It is therefore more advantageous to equip image forming station 40 with two image forming units 41. Considered in the axial direction of the image receiving support 1, these image forming units can be shorter than the image forming units 7 and then be mounted so as to be displaceable axially, so that they can be brought into any position with respect to image receiving support 1. Image forming units comparable to image forming units 8 are again provided at each of these displaceable image forming units provided that the supply of toner powder is carried out in manner known per se so that each type of toner used in the regular image forming stations 4 and 5 can be fed to the image forming units. In the case of faulty image forming elements in one or both image forming units 7, the image forming units 41 of image forming station 40 are controlled by the control unit 10 in the correct position with respect to the image receiving support 1, in which position one or more of their (non-faulty) image forming elements are exactly in line with the faulty image forming element or elements of the image-forming units 7, so that the function of this faulty image forming element is taken over. Of course, the associated color of toner powder is fed to the image forming units 41 and the energization times for the associated image forming element 1 in the image forming units 41 are controlled by the control unit 10 on the basis of the rotation of the image receiving support 1, so that the pixels are deposited at the correct location on the image receiving support 1.

It will be clear that the invention can be used in a similar manner to that described above in different printing apparatus from that illustrated with reference to FIG. 2. Apparatus of this kind is the magnetic, electrophotographic or ink jet devices already mentioned. In these devices, malfunctioning of an image forming element can also be due to soiling of said image forming element. If soiling is indicated as a probable cause of malfunctioning of an image forming element, the control unit will first activate a cleaning device (if present) or, if no cleaning device is installed, instruct the operator to carry out cleaning, and then change over to another possible solution only after the cleaning appears to have no effect. The check on the functioning of the various image forming elements can be carried out by the central control unit at different times as known per se in the control activities in printers and copiers. This check will normally be carried out as part of an overall check routine, whenever the printing apparatus is switched on from standstill. It can also be carried out, for example, after each copying or print job has been carried out, after a specific number of prints have been made, after the apparatus has been in operation for a specific time and/or whenever the check routine is switched on by an operator or maintenance engineer. The details arising from each check routine and the actions carried out in order to eliminate the adverse effect of an image forming element not operating as required can be stored by the control unit in a memory, whereafter they can be consulted by the maintenance engineer and used to carry out the required or necessary maintenance of the apparatus.

The use of electronic drivers as described above also has the advantage that the production process for the image forming units can be monitored by measuring at specific times, e.g. after each (critical) production stage, the output voltage delivered by each driver and, on the basis of the measurement, determine whether the production step was carried out as required, or which driver or drivers have faults (e.g. short-circuit and poor/no electrical connection), in order then to remedy the fault before the next production step is carried out.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. An image forming device for registration of images built up of pixels, comprising:

an image registration unit including a plurality of image forming elements and corresponding electronic drivers, each of the electronic drivers separately energizing a respective one of the image forming elements to form the pixels; and a control unit for controlling the image forming device, said electronic drivers including a measuring circuit for measuring an output characteristic of each electronic driver, said control unit including a malfunction detector operatively connected to the measuring circuit, the malfunction detector determining, by reference to the measured output characteristic, a malfunction of the image forming element driven by the associated driver and correction means for eliminating the malfunction or ameliorating a visible effect thereof on prints produced by the image forming device.

2. The image forming device according to claim 1, wherein the electronic drivers are provided with an adjustable current limiting means.

3. The image forming device according to claim 1, wherein the correction means includes image processing means, said image processing means ameliorating the visible effect of the malfunction by treating a first pixel corresponding to the malfunction and a second pixel adjacent to the first pixel as a single pixel element.

4. The image forming device according to claim 1, further comprising:

an auxiliary image registration unit, said control unit controlling said auxiliary image registration unit to take over a function of the malfunctioning image forming element.

5. The image forming device according to claim 4, further comprising:

a plurality of auxiliary image registration units, said control unit controlling said plurality of auxiliary image registration units to take over the functions of a plurality of malfunctioning image forming elements, wherein the auxiliary image registration units are separately provided from one another.

6. The image forming device according to claim 5, said auxiliary image registration units being displaceable, said control unit controlling the displacement of the auxiliary image registration units.

7. The image forming device according to claim 4, said auxiliary image registration unit being displaceable, said control unit controlling the displacement of the auxiliary image registration unit.

8. The image forming device according to claim 1, further comprising:

a cleaning device, said control unit activating the cleaning device when the measured output characteristic indicates a cleaning is desirable.

* * * * *